United States Patent [19]

Nicholson

[11] 4,372,564
[45] Feb. 8, 1983

[54] GASKETS FOR CYLINDER HEADS

[76] Inventor: Terence P. Nicholson, Calf Hall, Muggleswick, Derwentside, County Durham, England

[21] Appl. No.: 370,923

[22] Filed: Apr. 22, 1982

[30] Foreign Application Priority Data

May 1, 1981 [GB] United Kingdom ............ 8113496

[51] Int. Cl.$^3$ .............................................. F16J 15/08
[52] U.S. Cl. ................................ 277/235 B; 277/213; 277/236
[58] Field of Search ............... 277/1, 207 R, 213–215, 277/227, 233, 234, 235 R, 235 A, 235 B, 236

[56] References Cited

U.S. PATENT DOCUMENTS

| | | | |
|---|---|---|---|
| 3,606,361 | 9/1971 | Pohl et al. | 277/235 B |
| 4,121,846 | 10/1978 | Skrycki | 277/235 B X |
| 4,203,608 | 5/1980 | Nicholson | 277/213 X |
| 4,290,616 | 9/1981 | Nicholson | 277/213 X |

FOREIGN PATENT DOCUMENTS

| | | | |
|---|---|---|---|
| 508050 | 6/1939 | United Kingdom | 277/235 B |
| 1412468 | 11/1975 | United Kingdom | 277/213 |

*Primary Examiner*—Robert S. Ward, Jr.

[57] ABSTRACT

A gasket for sealing the joint between the cylinder block and the cylinder head of a wet liner internal combustion engine comprising a pair of outer metal plates (1), a metal spacer plate (2) between the two outer plates and comprised of an essential soft metal layer and hard metal surface layers there being fitted around each cylinder bore opening a metal washer (7) formed on each axial face with circumferential serrations (7a) of V-shaped profile. The thickness of the washer (7) measured over the peaks of the corrugations (7a) is somewhat greater than that of the spacer plate (2) whereas the thickness measured between the troughs of the serrations (7a) is significantly less than that of the spacer plate (2). According to the invention the outer metal plates (1) and central metal plates (2) have their edges spaced away from the individual cylinder bore openings whereas the washer (7) has its radially inner portion formed with the serrations (7a) which extend to the edge of the bore openings, whereas only its radially outer part is accommodated between the two outer metal plates (1).

3 Claims, 4 Drawing Figures

GASKETS FOR CYLINDER HEADS

In my co-pending British Pat. No. 2,064,677 there is disclosed an improved gasket for sealing the joint between the cylinder block and the cylinder head of a wet liner internal combustion engine. This gasket comprises a pair of outer plates having outwardly directed corrugations formed therein away from cylinder bore openings and a composite metal spacer plate disposed between the two outer plates. The metal spacer plate comprises a central soft metal layer and hard metal surface layers and around each cylinder bore opening and between the outer metal plates is a metal washer formed on each axial face with circumferential serrations of V-shaped profile. The thickness of the washer measured over the peaks of the corrugations is somewhat greater than that of the spacer plate whereas the thickness measured between the troughs of the serrations is significantly less than that of the spacer plate.

As originally devised, the two outer plates of the gasket together with the contained serrated washer extended up to the edge of each cylinder bore but in some installation instances due to lack of space and operating conditions this was not practical.

After research to discover an alternative but equally advantageous gasket there has now been devised according to the invention a gasket of the kind defined above which is characterised in that the outer and central metal plates have their edges spaced away from the individual cylinder bore openings whereas the serrated washer extends to the edge of those openings and has only its radially outer part accommodated between the two outer metal plates.

A preferred gasket in accordance with the present invention is illustrated in the accompanying drawings, in which.

Figure 1:
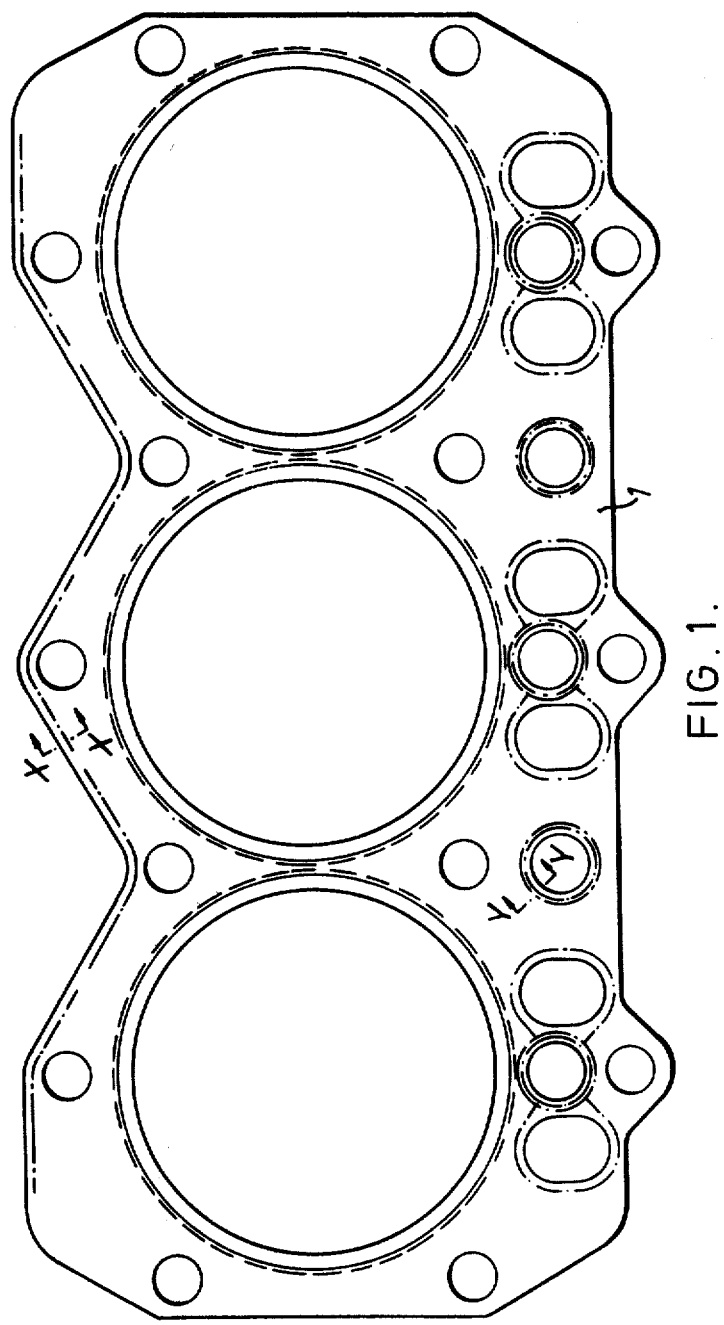
FIG. 1 is a general plan view of the gasket.

The gasket which is shown in the drawings and hereinafter described is intended to seal the joints between the cylinder block and the cylinder head of a bank of four cylinders of a V-8 compression ignition wet liner engine. The main part of this gasket is constructed in substantial accordance with the disclosure of my co-pending British Patent Application No. 7,940,625.

Figure 2:
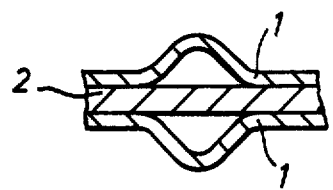
FIG. 2 is an enlarged section through a typical single wave corrugation shown in FIG. 1, e.g. on line X—X of FIG. 1.
Figure 3:
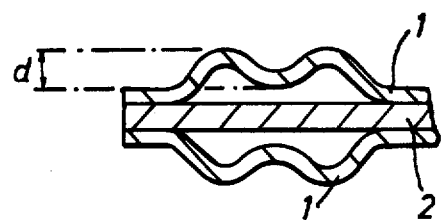
FIG. 3 is an enlarged section through a typical double wave corrugation shown in FIG. 1, e.g. on line Y—Y of FIG. 1.
Figure 4:
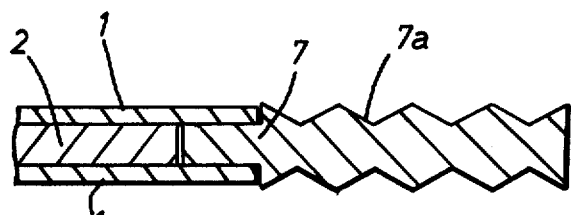
FIG. 4 is an enlarged section on line A—A of FIG. 1.

As shown most clearly in FIGS. 2, 3 and 4 the gasket comprises two outer cold rolled mild steel bright annealed BS2920 tin steel plates 1, each of 0.015 inches thickness and an interposed central composite spacer plate 2 which is 0.025 inches in thickness. This plate 2 is of cold rolled mild steel pinched nipped grade CS4 RCS (SP4BR) which has been zinc plated. It has however also been subjected before plating to a skin rolling operation which has the effect of forming a hard metal layer on each of its surfaces. Apart from this, the outer plates 1 are formed with corrugated configurations of two different forms. The paths of these corrugations on the gasket are illustrated in chain-dashed lines in FIG. 1, the chain lines being drawn at the peaks or locus points of the lines of corrugations.

Referring to FIG. 1 in conjunction with FIG. 2, one form of corrugation which runs along one side margin of the gasket is of single V-shaped profile. The single wave has an overall width of 1/16th inch and the corrugations are proud of the remainder of the outer plates by 0.025 inches.

The other form of corrugation is shown in FIG. 3 in conjunction with FIG. 1 and is of double V-shaped profile. This double V-shaped profile has the characteristic defined in my co-pending British Patent Application 4350/78 in that the distance d between a plane which contains the apices of the two waves and a plane parallel thereto which contains the base of the trough between the two waves is significantly less than the distance between the first plane and the base plane of the sheet. In the present instance the overall width of the two waves is ⅛ inch, the distance between wave peaks is 1/16 inch and the distance d is 0.013 inches.

In order to understand how the gasket is equipped in order to ensure satisfactory gas tight sealing in the region of the four cylinder bores reference should now be made to FIG. 1 in conjunction with FIG. 4.

Around each cylinder bore opening 4 in the gasket for a radial distance r sufficient to bridge a wet liner and the adjacent margin of the cylinder block there is fitted a washer 7. The radially outer part of this washer is clamped between the outer plates 2 of the gasket and the radially inward part of the washer 7 has annular serrations 7a on opposite sides. These serrations are of equal pitch at angular dispositions of 120° to one another and the total radial extent of the serrations in this instance is 0.266 inches. The maximum thickness of the washer 7, measured over the peaks of the serrations 7a is 0.062 inches and the intervening distance between the troughs of the serrations is 0.028 inches. The maximum thickness of the washer 7 thus somewhat exceeds the thickness of the spacer plate 2, thus ensuring high unit loading. The washer 7 may be made of zinc plated steel or, as in the present instance, from stainless steel depending upon the operating temperature of the engine in which the gasket is to be installed.

I claim:

1. A gasket for sealing the joint between the cylinder block and the cylinder head of a wet liner internal combustion engine comprising a pair of outer metal plates having outwardly directed corrugations formed therein away from cylinder bore openings and a composite metal spacer plate disposed between the two outer plates, the metal spacer plate comprising a central soft metal layer and hard metal surface layers and having around each cylinder bore opening and between the outer metal plates a metal washer formed on each axial face with circumferential serrations of V-shaped profile, the thickness of the washer measured over the peaks of the corrugations being somewhat greater than that of the spacer plate whereas the thickness measured between the troughs of the serrations is significantly less than that of the spacer plate, the said outer and central metal plates having their edges spaced away from the individual cylinder bore openings whereas the serrated washer extends to the edge of those openings and has only its radially outer part accommodated between the two outer metal plates.

2. A gasket in accordance with claim 1 wherein the angle between the troughs of the serrations is substantially 120°.

3. A gasket in accordance with claim 1 or claim 2 wherein the serrations have four equal pitches.

* * * * *